US011862901B2

(12) United States Patent
Parrish et al.

(10) Patent No.: US 11,862,901 B2
(45) Date of Patent: Jan. 2, 2024

(54) INTERPOSER

(71) Applicant: Teradyne, Inc., North Reading, MA (US)

(72) Inventors: Frank Parrish, North Reading, MA (US); Diwakar Saxena, North Reading, MA (US); Michael Herzog, North Reading, MA (US); Edward Dague, North Reading, MA (US); Michael F. Halblander, North Reading, MA (US)

(73) Assignee: TERADYNE, INC., North Reading, MA (US)

( * ) Notice: Subject to any disclaimer, the term of this patent is extended or adjusted under 35 U.S.C. 154(b) by 260 days.

(21) Appl. No.: 17/122,579

(22) Filed: Dec. 15, 2020

(65) Prior Publication Data

US 2022/0190527 A1 Jun. 16, 2022

(51) Int. Cl.

| | |
|---|---|
| ***H01R 13/6587*** | (2011.01) |
| ***H01R 12/51*** | (2011.01) |
| ***H01R 13/24*** | (2006.01) |

(52) U.S. Cl.

CPC ....... *H01R 13/6587* (2013.01); *H01R 12/515* (2013.01); *H01R 13/2428* (2013.01); *H01R 2201/20* (2013.01)

(58) Field of Classification Search

CPC .............. H01R 13/6587; H01R 12/515; H01R 13/2428; H01R 2201/20

See application file for complete search history.

(56) References Cited

U.S. PATENT DOCUMENTS

| | | | |
|---|---|---|---|
| 3,516,077 | A | 6/1970 | Bobeck et al. |
| 3,577,131 | A | 5/1971 | Morrow et al. |
| 3,673,433 | A | 6/1972 | Kupfer |
| 3,934,236 | A | 1/1976 | Aiken et al. |
| 4,021,790 | A | 5/1977 | Aiken et al. |

(Continued)

FOREIGN PATENT DOCUMENTS

| | | |
|---|---|---|
| CN | 1659810 A | 8/2005 |
| EP | 0298219 A2 | 1/1989 |

(Continued)

OTHER PUBLICATIONS

International Search Report for International Patent Application No. PCT/US2021/062039, dated Apr. 7, 2022, (4 pages).

(Continued)

*Primary Examiner* — Minh Q Phan
(74) *Attorney, Agent, or Firm* — Burns & Levinson LLP

(57) ABSTRACT

An interposer for a test system includes coaxial cables, each of which is configured to transport a first portion of current originating from a current source, and printed circuit boards (PCBs), each of which is connected to a set of the coaxial cables in order to receive the first portion of the current from each coaxial cable in the set and to transport a second portion of the current. A spring leaf assembly includes spring leaves, each of which is connected to a PCB in order to transport a third portion of the current obtained from the PCB to a device interface board (DIB) that connects to devices under test (DUTs) to be tested by the test system. The coaxial cables on each PCB are arranged in parallel, the PCBs are arranged in parallel, and the spring leaves on each PCB are arranged in parallel.

25 Claims, 6 Drawing Sheets

(56) References Cited

U.S. PATENT DOCUMENTS

| | | | | |
|---|---|---|---|---|
| 4,117,543 | A | 9/1978 | Minnick et al. | |
| 4,671,086 | A | 6/1987 | Fogleman et al. | |
| 4,686,912 | A | 8/1987 | Fogleman et al. | |
| 4,692,839 | A | 9/1987 | Lee et al. | |
| 4,729,166 | A | 3/1988 | Lee et al. | |
| 4,754,546 | A | 7/1988 | Lee et al. | |
| 4,757,256 | A | 7/1988 | Whann et al. | |
| 4,758,785 | A | 7/1988 | Rath | |
| 4,778,950 | A | 10/1988 | Lee et al. | |
| 4,804,132 | A | 2/1989 | DiFrancesco | |
| 4,829,236 | A | 5/1989 | Brenardi et al. | |
| 4,912,399 | A | 3/1990 | Greub et al. | |
| 4,918,383 | A | 4/1990 | Huff et al. | |
| 4,922,192 | A | 5/1990 | Gross et al. | |
| 4,954,873 | A | 9/1990 | Lee et al. | |
| 4,975,638 | A | 12/1990 | Evans et al. | |
| 4,980,637 | A | 12/1990 | Huff et al. | |
| 5,020,219 | A | 6/1991 | Leedy | |
| 5,072,176 | A | 12/1991 | Miller et al. | |
| 5,083,697 | A | 1/1992 | Difrancesco | |
| 5,103,557 | A | 4/1992 | Leedy | |
| 5,132,613 | A | 7/1992 | Papae et al. | |
| RE34,084 | E * | 9/1992 | Noschese ............. | H01R 12/714 439/82 |
| 5,180,977 | A | 1/1993 | Huff | |
| 5,264,787 | A | 11/1993 | Woith et al. | |
| 5,355,079 | A | 10/1994 | Evans et al. | |
| 5,364,404 | A | 11/1994 | Jaffe et al. | |
| 5,378,982 | A | 1/1995 | Feigenbaum et al. | |
| 5,416,429 | A | 5/1995 | McQuade et al. | |
| 5,422,574 | A | 6/1995 | Kister | |
| 5,456,404 | A | 10/1995 | Robinette, Jr. et al. | |
| 5,468,157 | A | 11/1995 | Roebuck et al. | |
| 5,469,072 | A | 11/1995 | Williams et al. | |
| 5,471,148 | A | 11/1995 | Sinsheimer et al. | |
| 5,528,158 | A | 6/1996 | Sinsheimer et al. | |
| 5,623,213 | A | 4/1997 | Liu et al. | |
| 5,629,630 | A | 5/1997 | Thompson et al. | |
| 5,666,397 | A | 9/1997 | Lamons et al. | |
| 5,914,613 | A | 6/1999 | Gleason et al. | |
| 5,968,282 | A | 10/1999 | Yamasaka | |
| 5,973,405 | A | 10/1999 | Keukelaar et al. | |
| 6,027,346 | A | 2/2000 | Sinsheimer et al. | |
| 6,107,813 | A | 8/2000 | Sinsheimer et al. | |
| 6,166,553 | A | 12/2000 | Sinsheimer | |
| 6,215,320 | B1 | 4/2001 | Parrish | |
| 6,246,245 | B1 | 6/2001 | Akram et al. | |
| 6,256,882 | B1 | 7/2001 | Gleason et al. | |
| 6,307,387 | B1 | 10/2001 | Gleason et al. | |
| 6,356,098 | B1 | 3/2002 | Akram et al. | |
| 6,359,337 | B1 | 3/2002 | Keukelaar et al. | |
| 6,437,584 | B1 | 8/2002 | Gleason et al. | |
| 6,494,734 | B1 | 12/2002 | Shuey | |
| 6,499,216 | B1 | 12/2002 | Fjelstad | |
| 6,515,499 | B1 | 2/2003 | Parrish et al. | |
| 6,566,898 | B2 | 5/2003 | Thiessen et al. | |
| 6,578,264 | B1 | 6/2003 | Gleason et al. | |
| 6,586,955 | B2 | 7/2003 | Fjelstad et al. | |
| 6,633,175 | B1 | 10/2003 | Evans et al. | |
| 6,661,244 | B2 | 12/2003 | McQuade et al. | |
| 6,686,732 | B2 | 2/2004 | Parrish | |
| 6,690,186 | B2 | 2/2004 | Fjelstad | |
| 6,708,386 | B2 | 3/2004 | Gleason et al. | |
| 6,756,797 | B2 | 6/2004 | Brandorff et al. | |
| 6,784,679 | B2 | 8/2004 | Sweet et al. | |
| 6,825,677 | B2 | 11/2004 | Gleason et al. | |
| 6,833,696 | B2 | 12/2004 | Sinsheimer et al. | |
| 6,838,890 | B2 | 1/2005 | Tervo et al. | |
| 6,860,009 | B2 | 3/2005 | Gleason et al. | |
| 6,871,307 | B2 | 3/2005 | Nachumovsky | |
| 6,888,427 | B2 | 5/2005 | Sinsheimer et al. | |
| 6,911,835 | B2 | 6/2005 | Chraft et al. | |
| 6,916,990 | B2 | 7/2005 | Behziz et al. | |
| 6,927,585 | B2 | 8/2005 | Gleason et al. | |
| 6,927,586 | B2 | 8/2005 | Thiessen | |
| 6,930,498 | B2 | 8/2005 | Tervo et al. | |
| 6,939,175 | B2 | 9/2005 | Parrish et al. | |
| 6,951,482 | B1 | 10/2005 | Miller et al. | |
| 6,963,211 | B2 | 11/2005 | Sinsheimer et al. | |
| 6,965,244 | B2 | 11/2005 | Miller | |
| 7,078,890 | B2 | 7/2006 | Sinsheimer et al. | |
| 7,084,657 | B2 | 8/2006 | Matsumura | |
| 7,109,731 | B2 | 9/2006 | Gleason et al. | |
| 7,148,711 | B2 | 12/2006 | Tervo et al. | |
| 7,161,363 | B2 | 1/2007 | Gleason et al. | |
| 7,178,236 | B2 | 2/2007 | Gleason et al. | |
| 7,180,321 | B2 | 2/2007 | Behziz et al. | |
| 7,227,371 | B2 | 6/2007 | Miller | |
| 7,233,160 | B2 | 6/2007 | Hayden et al. | |
| 7,266,889 | B2 | 9/2007 | Gleason et al. | |
| 7,271,603 | B2 | 9/2007 | Gleason et al. | |
| 7,273,806 | B2 | 9/2007 | Groves et al. | |
| 7,285,969 | B2 | 10/2007 | Hayden et al. | |
| 7,295,024 | B2 | 11/2007 | Sinsheimer | |
| 7,304,488 | B2 | 12/2007 | Gleason et al. | |
| 7,307,293 | B2 | 12/2007 | Fjelstad et al. | |
| 7,355,420 | B2 | 4/2008 | Smith et al. | |
| 7,358,754 | B2 | 4/2008 | Sinsheimer et al. | |
| 7,368,927 | B2 | 5/2008 | Smith et al. | |
| 7,382,143 | B2 | 6/2008 | Di Stefano | |
| 7,400,155 | B2 | 7/2008 | Gleason et al. | |
| 7,403,025 | B2 | 7/2008 | Tervo et al. | |
| 7,403,028 | B2 | 7/2008 | Campbell | |
| 7,417,446 | B2 | 8/2008 | Hayden et al. | |
| 7,420,381 | B2 | 9/2008 | Burcham et al. | |
| 7,427,868 | B2 | 9/2008 | Strid et al. | |
| 7,436,194 | B2 | 10/2008 | Gleason et al. | |
| 7,443,181 | B2 | 10/2008 | Miller | |
| 7,443,186 | B2 | 10/2008 | Strid et al. | |
| 7,449,899 | B2 | 11/2008 | Campbell et al. | |
| 7,453,275 | B2 | 11/2008 | Yamaguchi | |
| 7,453,276 | B2 | 11/2008 | Hayden et al. | |
| 7,456,646 | B2 | 11/2008 | Hayden et al. | |
| 7,482,823 | B2 | 1/2009 | Gleason et al. | |
| 7,489,149 | B2 | 2/2009 | Gleason et al. | |
| 7,492,175 | B2 | 2/2009 | Smith et al. | |
| 7,495,461 | B2 | 2/2009 | Hayden et al. | |
| 7,498,829 | B2 | 3/2009 | Gleason et al. | |
| 7,501,842 | B2 | 3/2009 | Gleason et al. | |
| 7,504,822 | B2 | 3/2009 | Parrish et al. | |
| 7,504,842 | B2 | 3/2009 | Schwindt | |
| 7,514,944 | B2 | 4/2009 | Smith et al. | |
| 7,518,387 | B2 | 4/2009 | Gleason et al. | |
| 7,533,462 | B2 | 5/2009 | Gleason et al. | |
| 7,535,247 | B2 | 5/2009 | Andrews et al. | |
| 7,541,819 | B2 | 6/2009 | Parrish et al. | |
| 7,541,821 | B2 | 6/2009 | Gleason et al. | |
| 7,601,039 | B2 | 10/2009 | Eldridge et al. | |
| 7,609,077 | B2 | 10/2009 | Campbell et al. | |
| 7,619,419 | B2 | 11/2009 | Campbell | |
| 7,640,651 | B2 | 1/2010 | Cohen et al. | |
| 7,656,172 | B2 | 2/2010 | Andrews et al. | |
| 7,681,312 | B2 | 3/2010 | Gleason et al. | |
| 7,688,097 | B2 | 3/2010 | Hayden et al. | |
| 7,701,232 | B2 | 4/2010 | Parrish | |
| 7,723,999 | B2 | 5/2010 | Strid et al. | |
| 7,750,652 | B2 | 7/2010 | Campbell | |
| 7,759,953 | B2 | 7/2010 | Strid et al. | |
| 7,761,983 | B2 | 7/2010 | Hayden et al. | |
| 7,761,986 | B2 | 7/2010 | Gleason et al. | |
| 7,764,072 | B2 | 7/2010 | Strid et al. | |
| 7,764,075 | B2 | 7/2010 | Miller | |
| 7,791,361 | B2 | 9/2010 | Karklin et al. | |
| 7,800,001 | B2 | 9/2010 | Hamada et al. | |
| 7,815,466 | B2 | 10/2010 | Yaghmai et al. | |
| 7,820,614 | B2 | 10/2010 | Tee, Jr. et al. | |
| 7,876,087 | B2 | 1/2011 | Mok et al. | |
| 7,876,114 | B2 | 1/2011 | Campbell et al. | |
| 7,888,957 | B2 | 2/2011 | Smith et al. | |
| 7,893,704 | B2 | 2/2011 | Gleason et al. | |
| 7,898,273 | B2 | 3/2011 | Gleason et al. | |
| 7,898,281 | B2 | 3/2011 | Andrews et al. | |
| 7,934,944 | B2 | 5/2011 | Hamada et al. | |
| 7,934,945 | B2 | 5/2011 | Narita et al. | |

(56) References Cited

U.S. PATENT DOCUMENTS

| | | | |
|---|---|---|---|
| 7,940,069 B2 | 5/2011 | Andrews et al. | |
| 7,977,583 B2 | 7/2011 | Yaghmai et al. | |
| 8,013,623 B2 | 9/2011 | Burcham et al. | |
| 8,033,838 B2 | 10/2011 | Eldridge et al. | |
| 8,201,328 B2 | 6/2012 | Yaghmai et al. | |
| 8,202,684 B2 | 6/2012 | Hamada et al. | |
| 8,212,580 B2 | 7/2012 | Izadian | |
| 8,322,020 B2 | 12/2012 | Hisu et al. | |
| 8,373,428 B2 | 2/2013 | Eldridge et al. | |
| 8,410,806 B2 | 4/2013 | Smith | |
| 8,451,017 B2 | 5/2013 | Gleason et al. | |
| 8,575,954 B2 | 11/2013 | Chong et al. | |
| 8,622,752 B2 | 1/2014 | Parrish et al. | |
| 8,657,631 B2 | 2/2014 | Ang et al. | |
| 8,853,693 B2 | 10/2014 | Ding et al. | |
| 9,435,855 B2 | 9/2016 | Lewinnek et al. | |
| 9,594,114 B2 | 3/2017 | Sinsheimer | |
| 9,601,257 B2 | 3/2017 | Burke et al. | |
| 9,786,977 B2 | 10/2017 | Yons et al. | |
| 10,060,475 B2 | 8/2018 | Sinsheimer et al. | |
| 10,451,652 B2 | 10/2019 | Sinsheimer et al. | |
| 10,677,815 B2 | 6/2020 | Mirkhani et al. | |
| 2005/0208787 A1 | 9/2005 | Dittmann | |
| 2006/0073723 A1* | 4/2006 | Cowgill | H01R 13/6315 439/247 |
| 2007/0126439 A1 | 6/2007 | Sinsheimer et al. | |
| 2007/0176615 A1 | 8/2007 | Sinsheimer | |
| 2007/0286173 A1* | 12/2007 | Li | H04L 12/66 370/356 |
| 2008/0025012 A1 | 1/2008 | Sinsheimer | |
| 2008/0030211 A1 | 2/2008 | Sinsheimer | |
| 2008/0030212 A1 | 2/2008 | Sinsheimer | |
| 2008/0030213 A1 | 2/2008 | Sinsheimer | |
| 2008/0100323 A1 | 5/2008 | Mayder | |
| 2010/0117673 A1* | 5/2010 | Lee | G01R 1/07378 324/762.05 |
| 2011/0095778 A1 | 4/2011 | Chou et al. | |
| 2012/0152309 A1 | 6/2012 | Miller et al. | |
| 2012/0299798 A1 | 11/2012 | Leisten | |
| 2015/0073008 A1 | 3/2015 | Hardas et al. | |
| 2015/0377946 A1 | 12/2015 | Sinsheimer | |
| 2016/0006151 A1* | 1/2016 | Liu | H01R 12/722 439/78 |
| 2016/0131702 A1 | 5/2016 | Sinsheimer | |
| 2016/0365661 A1* | 12/2016 | Annis | H01R 13/6581 |
| 2022/0384288 A1* | 12/2022 | Lin | H01L 23/49816 |

FOREIGN PATENT DOCUMENTS

| | | | |
|---|---|---|---|
| EP | 0361779 | A1 | 4/1990 |
| KR | 10-2013-0036135 | A | 4/2013 |
| KR | 10-2018-0137761 | A | 12/2018 |
| WO | 88/05544 | A1 | 7/1988 |
| WO | 2013/134568 | A1 | 9/2013 |
| WO | 2016010888 | A1 | 1/2016 |

OTHER PUBLICATIONS

Written Opinion for International Patent Application No. PCT/US2021/062039, dated Apr. 7, 2022, (6 pages).

International Search Report for PCT/US2015/040128, 3 pages, dated Oct. 29, 2015.

Written Opinion for PCT/US2015/040128, 6 pages, dated Oct. 29, 2015.

Chinese Office Action for 201580036175.0, 8 pages, dated Nov. 28, 2018.

"New Product Release: Reliant Switch for better RF testing," DowKey.com, copyright 2010, retrieved on Feb. 3, 2015, http://www.dowkey.com/news_details.php?id=110.

"Reliant Switch High Repeatability", DowKey.com, Data Sheet; retrieved on Feb. 3, 2015; http://www.dowkey.com/_news_attach_files/0/_plkl21_I_Reliant_Switch_Datasheet.pdf.

International Search Report and Written Opinion; PCT/US2014/063646; dated Jan. 28, 2015; 13 pp.

Kister et al., "Test Cost Reduction Using the Membrane Probe", Probe Technology, Santa Clara, CA (at least before Apr. 22, 1997, the issue date of U.S. Pat. No. 5,623,213).

Fisher et al., "Reducing Test Costs for High-Speed and High Pin-Count Devices", Probe Technology, Feb. 1992, Santa Clara, CA.

Fresh Quest Corporation, "Fresh Quest Corporation Announces the Deliver of QC2™ Bare Die Carriers and QPC™ Probe Cards for the Production of Known Good Die", Chandler, AZ (at least before Apr. 22, 1997, the issue date of U.S. Pat. No. 5,623,213).

Fresh Quest Corporation, "Quest Pricing Guidelines" (at least before Apr. 22, 1997, the issue date of U.S. Pat. No. 5,623,213).

Hewlett Packard, "High Speed Wafer Probing with the HP 83000 Model F660", 1993, Germany.

Hughes Aircraft Company, "Additional Technical Data for Hughes' Membrane Test Probe", 1993.

Hughes, "Membrane Wafer Probe—The Future of the IC Test Industry" (at least before Apr. 22, 1997, the issue date of U.S. Pat. No. 5,623,213).

Packard Hughes Interconnect, "Science Over Art, Our New IC Membrane Test Probe", 1993, Irvine, CA.

Packard Hughes Interconnect, "Our New IC Membrane Test Probe. It's priced the Sarne, But It Costs Less.", 1993, Irvine, CA.

Probe Technology, "Membrane Probe Card-The Concept" (at least before Apr. 22, 1997, the issue date of U.S. Pat. No. 5,623,213).

Probe Technology, "Prober Interface Unit for HP83000 Model INT768" (at least before Apr. 22, 1997, the issue date of U.S. Pat. No. 5,623,213).

Chong et al., "The Evolution ofMCM Test from High Performance Bipolar Mainframe Multichip Modules to Low Cost Work Station Mulitchip Modules", ICEMM Proceedings '93, pp. 404-410.

Doane, D., "Foreword: Advancing MCM Technologies", IEEE Transactions on Components, Packaging, and Manufacturing Technology-Part B: Advanced Packaging, 17(1):1 (Feb. 1994).

Davidson, E., "Design, Analysis, Applications", IEEE Transactions on Components, Packaging, Manufacturing Technology-Part B: Advanced Packaging, 17(1):2 (Feb. 1994).

Russell, T., "Testing", IEEE Transactions on Components, Packaging, Manufacturing Technology-Part B: Advanced Packaging, 17(1):2 (Feb. 1994).

Marshall et al., "CAD-Based Net Capacitance Testing of Unpopulated MCM Substrates", IEEE Transactions on Components, Packaging, Manufacturing Technology-Part B: Advanced Packaging, 17(1):50-55 (Feb. 1994).

Economikos et al., "Electrical Test of Multichip Substrates", IEEE Transactions on Components, Packaging, Manufacturing Technology-Part B: Advanced Packaging, 17(1):56-61 (Feb. 1994).

Brunner et al., "Electron-Beam MCM Testing and Probing", IEEE Transactions on Components, Packaging, Manufacturing Technology-Part B: Advanced Packaging (1994).

West, et al., Principles of CMOS VLSI Design: A Systems Perspective, 2nd Ed., Chapter 8 (1993).

Reid et al., "Micromachined Rectangular-Coaxial Transmission Lines", IEEE Transactions on Microwave Theory and Techniques, vol. 54, No. 8 (Aug. 2006).

Ralston et al., "Liquid-Metal Vertical Interconnects for Flip Chip Assembly of GaAs C-Band Power Amplifiers Onto Micro-Rectangular Coaxial Transmission Lines", IEEE Journal of Solid-State Circuits, vol. 47, No. 10 (Oct. 2012).

International Preliminary Report on Patentability for PCT/US2015/040128, 7 pages ( dated Jan. 17, 2017).

International Preliminary Report on Patentability in Application No. PCT/US2021/062039 dated Jun. 29, 2023, 8 pages.

* cited by examiner

INTERPOSER

TECHNICAL FIELD

This specification describes examples of interposers configured to act as interfaces to a device, such as a device interface board (DIB) in a test system.

BACKGROUND

An example interposer includes an interconnect for transmitting signals between a source and a destination. For example, an interposer may include electrical pathways to transmit electrical signals between components of a system.

SUMMARY

An interposer for a test system includes coaxial cables, each of which is configured to transport a first portion of current originating from a current source, and printed circuit boards (PCBs), each of which is connected to a set of the coaxial cables in order to receive the first portion of the current from each coaxial cable in the set and to transport a second portion of the current. A spring leaf assembly includes spring leaves, each of which is connected to a PCB in order to transport a third portion of the current obtained from the PCB to a device interface board (DIB) that connects to devices under test (DUTs) to be tested by the test system. The coaxial cables on each PCB, including the inner and outer conductors of the coaxial cables on each PCB, are arranged in parallel, the PCBs are arranged in parallel, and the spring leaves on each PCB are arranged in parallel. The example interposer may include one or more of the following features, either alone or in combination.

The interposer may have an inductance of 100 nanohenries (nH) or less for a current of 2000 amperes (A) or more. The interposer may have a resistance of 3 milliohms (mΩ) or less for a current of 2000 amperes (A) or more. The interposer may have an inductance of 500 nanohenries (nH) or less for a current of 2000 amperes (A) or more. The interposer may have a resistance of 10 milliohms (mΩ) or less for a current of 2000 amperes (A) or more.

The first portion of the current may be different from the second portion of the current. The first portion of the current may be equal to the third portion of the current. The second portion of the current may be different from the third portion of the current. The second portion of the current may be different from the third portion and the first portion.

On each PCB, a set of the spring leave may be arranged such that adjacent spring leaves have different polarities. Each coaxial cable may include a center conductor and shield surrounding the center conductor. The shield may include a return for current transmitted through the center conductor. The shield and the center conductor may implement a least some inductance cancellation. The shield and the center conductor may maximize inductance cancellation.

The interposer may include a shroud comprised of electrically-insulating insulating material. The shroud may be at least partly around the spring leaf assembly. The interposer may be part of a blind-mate connection within a test head of the test system. The interposer may include electrically-insulating material separating each of the PCBs. Each PCB may include a surge suppressor to protect against voltage spikes or current spikes on the PCB.

The coaxial cables, the PCBs, and the spring leaves may be configured and arranged to achieve a target resistance and a target inductance of the interposer. The interposer may connect to low-inductance copper pads on the DIB within an area that is 2 inches (5.08 centimeters (cm)) by 3 inches (7.62 cm) or less.

An example test system includes a device interface board (DIB) to connect to devices under test (DUTs) and a test head comprising a blind-mate connection to the DIB. The blind-mate connection includes an interposer assembly. The interposer assembly includes coaxial cables, each of which is configured to transport a first portion of current originating from a current source, and printed circuit boards (PCBs), each of which is connected to a set of the coaxial cables in order to receive the first portion of the current from each coaxial cable in the set and to transport a second portion of the current. A spring leaf assembly includes spring leaves, each of which is connected to a PCB in order to transport a third portion of the current obtained from the PCB to the DIB. The coaxial cables on each PCB are arranged in parallel, the PCBs are arranged in parallel, and the spring leaves on each PCB are arranged in parallel. The example test system may include one or more of the following features, either alone or in combination.

The coaxial cables may have lengths defined in double-digit meters or less, lengths defined in single-digit meters or less, lengths defined in single-digit decimeters or less, or lengths defined in single-digit centimeters or less. The coaxial cables, the PCBs, and the spring leaves may be configured and arranged to reduce, or to minimize, the resistance and the inductance of the interposer assembly. The coaxial cables, the PCBs, and the spring leaves may be configured and arranged to implement a target resistance and a target inductance of the interposer assembly.

Any two or more of the features described in this specification, including in this summary section, may be combined to form implementations not specifically described in this specification.

At least part of the systems and techniques described in this specification may be configured or controlled by executing, on one or more processing devices, instructions that are stored on one or more non-transitory machine-readable storage media. Examples of non-transitory machine-readable storage media include read-only memory, an optical disk drive, memory disk drive, and random access memory. At least part of the systems and techniques described in this specification may be configured or controlled using a computing system comprised of one or more processing devices and memory storing instructions that are executable by the one or more processing devices to perform various control operations including high-current testing. At least some of the devices, systems, and/or components described herein may be configured, for example through design, construction, arrangement, placement, programming, operation, activation, deactivation, and/or control.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

An example interposer includes an interconnect for transmitting signals between a source and a destination. For example, the interposer may include electrical conductors to transmit electrical signals between components of a test system.

An example interposer includes coaxial cables, each of which is configured to transport a first portion of current originating from a current source. The example interposer also includes printed circuit boards (PCBs), each of which is connected to a set of the coaxial cables in order to receive the first portion of the current from each coaxial cable in the set and to transport a second portion of the current. A spring leaf assembly includes spring leaves, each which is connected to a PCB in order to transport a third portion of the current obtained from the PCB to a device interface board (DIB) that connects to devices under test (DUTs) to be tested by the test system. Inner and outer conductors of the coaxial cables on each PCB are arranged in parallel, the PCBs are arranged in parallel, and the spring leaves on each PCB may be arranged in parallel. In some implementations, two or more of the first portion of current, the second portion of current, or the third portion of current—for example, all three—are different.

Implementations of the interposer may enable relatively high currents to be transmitted through the interposer at relatively low inductances and resistances. In this regard, inductance includes the tendency of an electrical conductor to oppose a change in current flowing therethrough. Resistance is a measure of the opposition to current flow through a conductor. It is therefore preferable to keep inductance and resistance values low. With regard to inductance, in some implementations, the current through the interposer is pulsed at least part of the time or all of the time. A pulsed current may include a rapid, transient change in amplitude from a baseline value such as "0" to a higher or lower value, followed by a rapid return to the baseline value. In some implementations, the current is periodic, for example. Reducing inductance reduces the opposition to changes in current such as these.

Examples of high current include, but are not limited to, currents over 500 Amperes (A), over 1000 A, over 2000 A, over 3000 A, or more. Examples of low inductance include, but are not limited to 100 nanoHenries (nH) to 60 nH or less. Examples of low resistance include 10 milliohms (Ω) or less or 3 mΩ or less.

Figure 6:
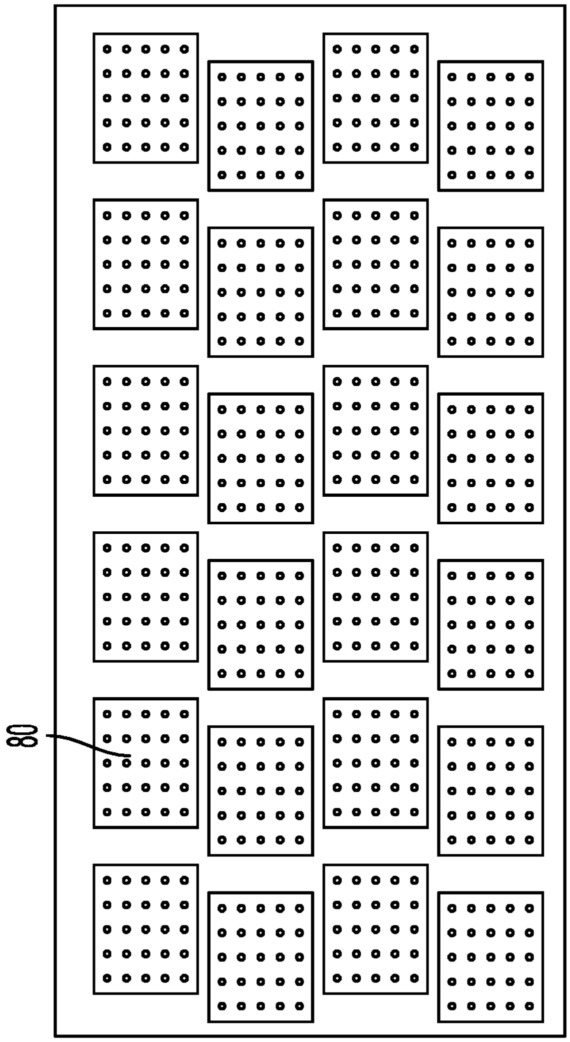
FIG. 6 shows example pads to which the interposer connects.

Implementations of the interposer may be relatively small in terms of physical dimensions. For example, referring to FIG. 6, the interposer may connect to low-inductance copper pads 80 on the DIB (or on a probe card, for example) on an area of the DIB (or probe card) within an area that is 2 inches (5.08 centimeters (cm)) by 3 inches (7.62 cm) or less. In an example, the interposer connects to the DIB within an area that is 1.5 inches (3.81 cm) by 2.5 inches (6.35 cm). The parallel conductors included in the interposer may enable such small sizes while maintaining relatively low resistance and inductance values even at relatively high currents. However, interposers having the features described herein are not limited to any particular dimensions or values of resistance, inductance, or current.

FIGS. 1 to 4 shows an example implementation of an interposer 10 that may have features like those described in the preceding paragraphs. Interposer 10 includes PCBs 12, 13, 14, 15, 16, and 17. Although six PCBs are included in the implementation of FIGS. 1 to 4, interposer 10 may include more than six PCBs or fewer than six PCBs. Each PCB includes a non-conductive substrate such as G10 FR-4, which is a glass-reinforced epoxy laminate material. One or more electrically-conductive conduits run through or over the substrate to carry electrical signals, such as current, from the input of each PCB to the output of each PCB. Generally, the more signal pathways that there are through a PCB, the lower will be the resistance and inductance of that PCB.

Figure 3:
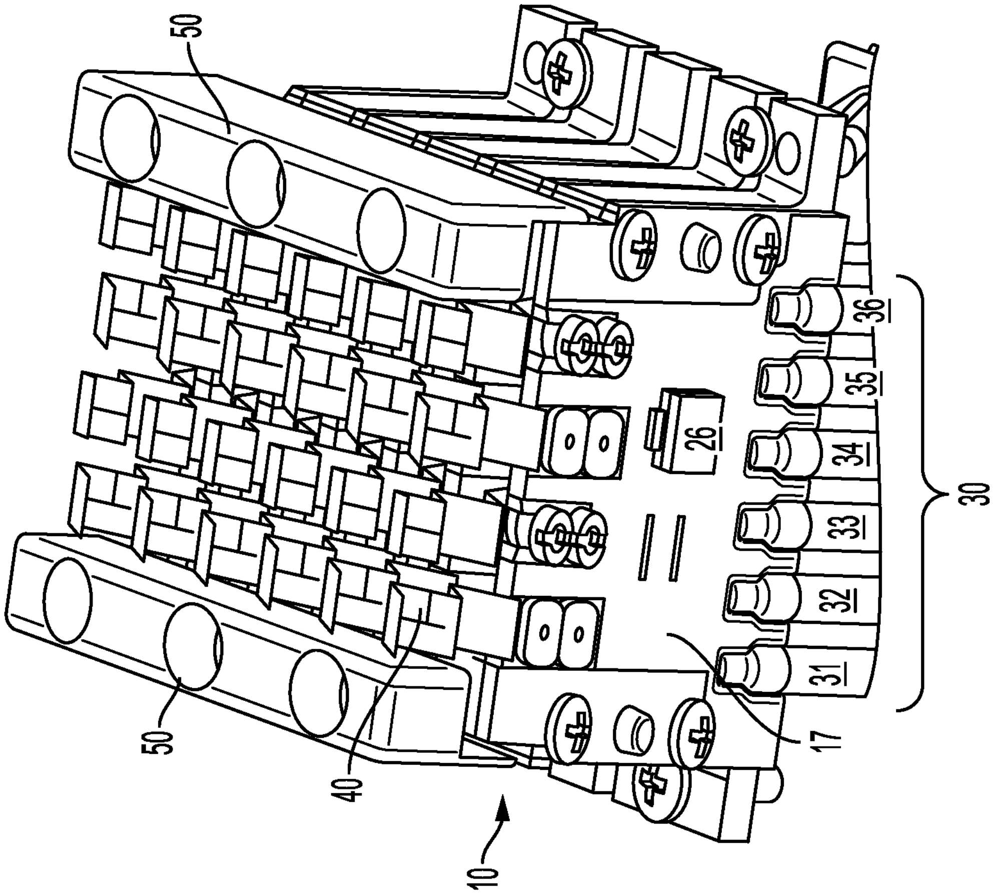
FIG. 3 is a front perspective view drawing of the example interposer.

Non-conductive spacers 20, 21, 22, 23, and 24 separate adjacent PCBs within the interposer. Non-conductive spacers 20 to 24 may be made of G10 FR-4 or any appropriate dielectric—that is, an electrically-non-conductive material. As shown in FIG. 3, in some implementations, each PCB may also include a surge suppressor 26 to protect against voltage spikes or current spikes on that PCB.

The input to each PCB includes multiple coaxial cables 30. In the example configuration of FIGS. 1 to 4, there are six coaxial cables 31, 32, 33, 34, 35, and 36 per PCB. Each of the coaxial cables 30 may connect to the PCB using edge plating 29, in which each cable is spliced and soldered to the PCB. Although six coaxial cables are shown per board in FIGS. 1 to 4, interposer 10 may include more than six coaxial cables per PCB or fewer than six coaxial cables per PCB. Accordingly, in the example of FIGS. 1 to 4, there are 36 coaxial cables in total on interposer 10. A coaxial cable includes an inner conductor surrounded by a concentric conducting shield. The inner conductor and the concentric conducting shield are separated by a dielectric. Each coaxial cable also includes a protective outer sheath that is also non-conductive. Current passes through the inner conductor of each coaxial cable 30, with the concentric conducting shield acting as a return path for current. For example, force-high (or positive) current may pass through the inner conductor and force-low (or negative) current may pass through the outer conductor, where force-high currents and force-low currents correspond to currents having different polarities. Use of the center conductor and the concentric conductive shield to transmit force-current high and force-current low signals, respectively, may limit or reduce inductance in the coaxial cables through inductance cancellation effects. In addition, thin dielectrics, such as in a range of 2 mils (0.5 millimeters (mm)) to 10 mils (0.25 mm), may also contribute to inductance cancellation.

The coaxial cables for a PCB connect electrically to the electrically-conductive conduits in the PCB via an edge plating technique. For example, the inner conductor of a coaxial cable may connect electrically to a first set of the electrically-conductive conduits in the PCB, where the first set may include one or more of the electrically-conductive conduits. The outer (or return) conductor of the same coaxial cable may connect electrically to a second set of the electrically-conductive conduits in the PCB, where the second set may include one or more of the electrically-conductive conduits that are different than the first set. Different coaxial cables may connect in this way to different sets of conduits on a PCB. Current from the coaxial cables connected to a PCB, such as PCB 17, thus runs through that PCB, with a return path also running through the PCB. In some implementation, sets of electrically-conductive conduits on the PCB that transport current having different polarities are adjacent. For example, no two sets of electrically-conductive conduits on a PCB may transport current of the same polarity. This may produce at least some inductive cancellation on the PCB.

Figure 1:
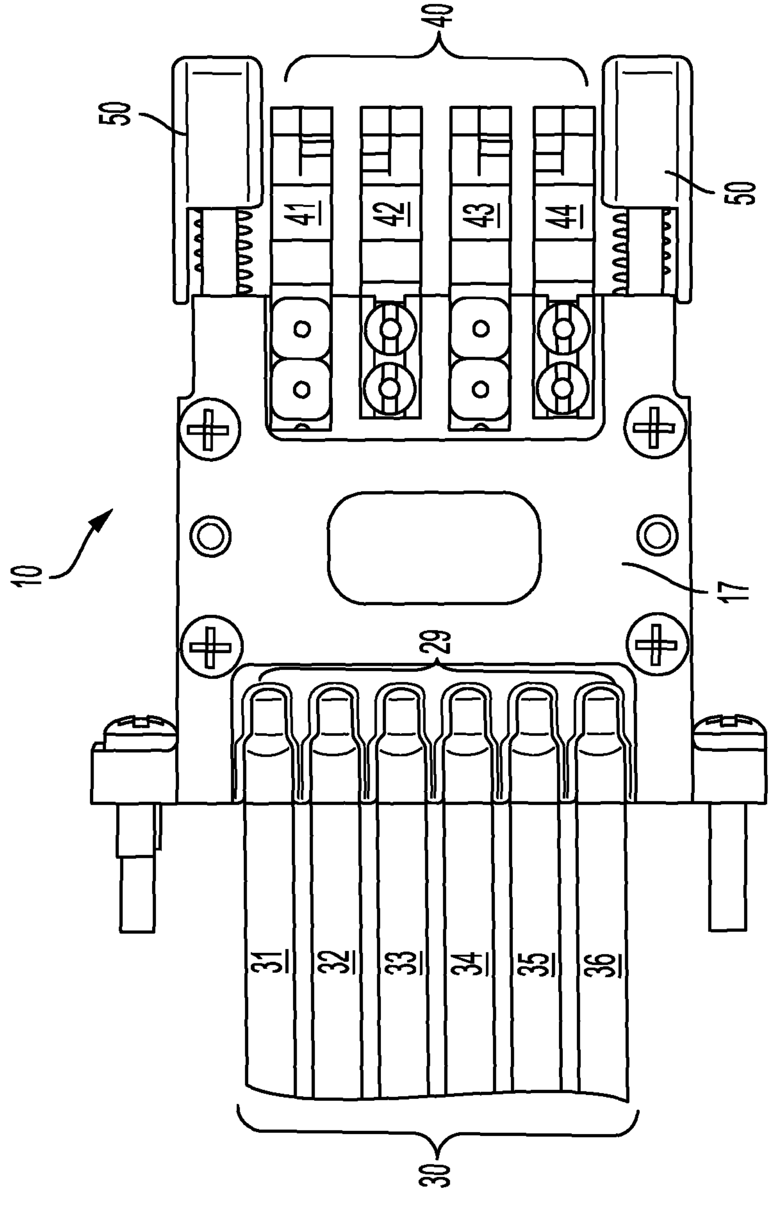
FIG. 1 is a side view drawing of an example interposer.
Figure 2:
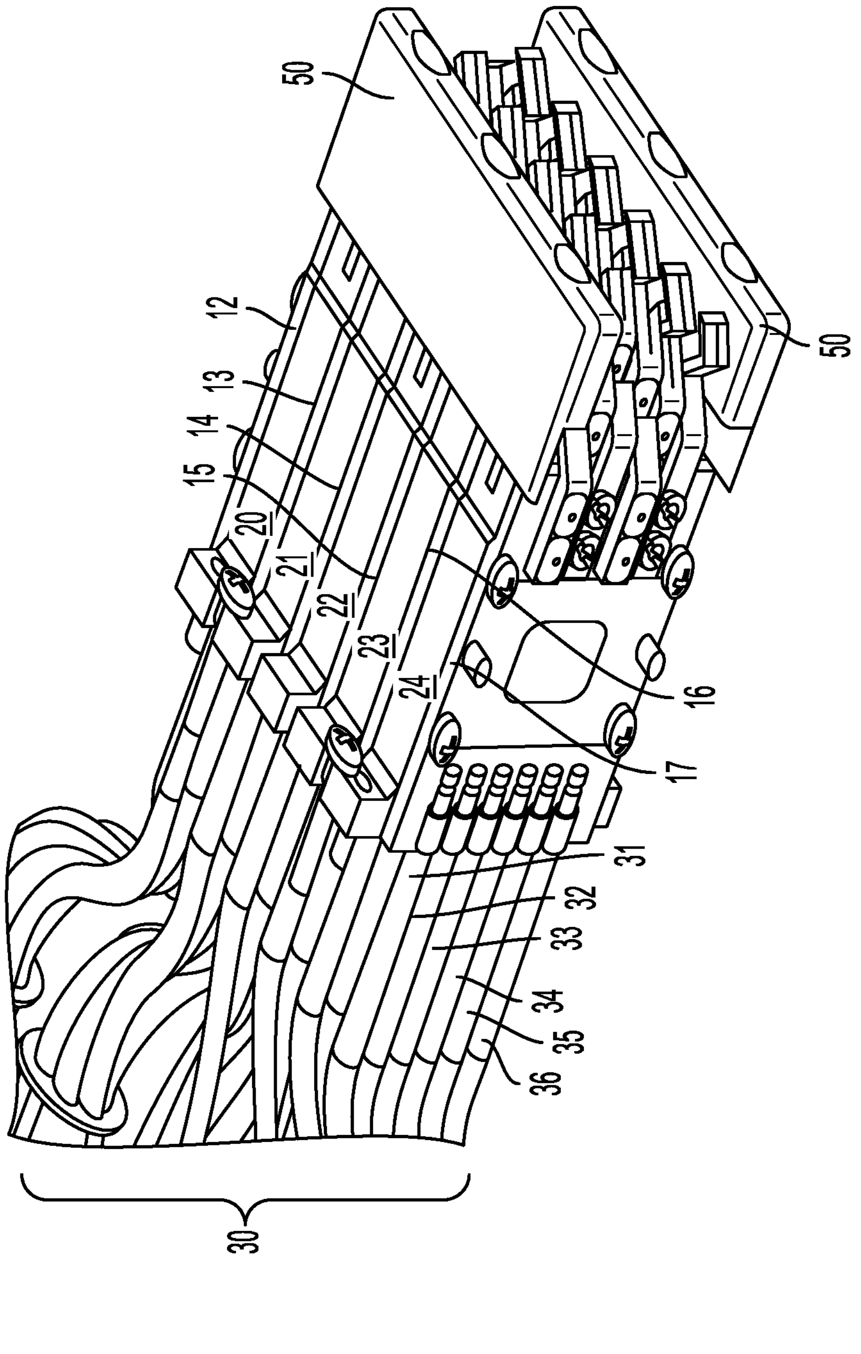
FIG. 2 is a side perspective view drawing of the example interposer.

The output of each PCB 12 to 17 also includes a spring leaf assembly 40 (see FIG. 1). Each PCB may include edge plating to implement such connections. Each spring leaf assembly 40 includes multiple leaves 41, 42, 43, and 44. Each leaf includes an electrically-conductive material that is connectable, electrically, to one or more of the electrically-conductive conduits on the PCB. A leaf may include a pre-loaded spring finger that is compressible to provide a stable electrical contact. As shown in FIGS. 1 and 3, in some implementations there are four spring leaves on each PCB; however, in some implementations there may be different numbers of spring leaves per PCB.

In some implementations, each of the spring leaves is connected to a corresponding PCB in order to transport a portion of the current obtained from the PCB to a device interface board (DIB) of a test system. The spring leaf connectors may be arranged to alternate in polarity. For example, in a case where there are four spring leaf connectors on a PCB, a first leaf connector 41 may be for a force-high current path, a second leaf connector 42 adjacent to the first leaf connector may be for a force-low or return current path, a third leaf connector 43 adjacent to the second leaf connector may be for a force-high current path, and a fourth leaf connector 44 adjacent to the third leaf connector may be for a force-low or return current path. In this example, the first (force-high) leaf connector 41 may connect electrically to a first set of the electrically-conductive conduits in the PCB, where the first set may include one or more of the electrically-conductive conduits. The second (force-low or return) leaf connector 42 may connect electrically to a second set of the electrically-conductive conduits in the PCB, where the second set may include one or more of the electrically-conductive conduits that are different than the first set. The third (force-high) leaf connector 43 may connect electrically to a third set of the electrically-conductive conduits in the PCB, where the third set may include one or more of the electrically-conductive conduits that are different than the first set and the second set. The fourth (force-low or return) leaf connector 44 may connect electrically to a fourth set of the electrically-conductive conduits in the PCB, where the fourth set may include one or more of the electrically-conductive conduits that are different than the first set, the second set, and the third set.

As shown in the figures, the coaxial cables 30 on each PCB are arranged in parallel with each other, the PCBs are arranged in parallel with each other, and the spring leaves 40 on each PCB are arranged in parallel with each other. In addition, the groups of coaxial cables (in this example, six coaxial cables) on each PCB are also in parallel with each other. And, the groups of spring leaf connectors (in this example, four spring leaf connectors) on each PCB are also in parallel with each other. Use of parallel connections such as these, provide support for high levels of current, such as, but not limited to, currents over 500 Amperes (A), 1000 A or more, 2000 A or more, or 3000 A or more. Use of parallel connections such as these, also provide support for low levels of current, such as currents of less than 500 A, less than 5 A, less than 1 A, and into or below the single-digit milliampere range. In addition, by alternating force and return paths within interposer 10, along with use of coaxial cables, inductance in the interposer can be limited or reduced to, for example, 100 nanoHenries (nH) to 60 nH or less. The multiple parallel paths also function to limit or to reduce resistance in the interposer.

In this regard, in the example presented in FIGS. 1 to 4, there may be 2000 A of pulsed current passing through interposer 10. For example, there may be pulsed current of 2000 Amps on the force and return each passing through the interposer 10. In this case, there are 36 coaxial cables (six per PCB), each of which transports 55 A of pulsed current. There are six PCBs, each of which transports 300 A of pulsed current. There are 24 spring leaf connectors, 12 of which are force connectors that each transports 166.6 A of pulsed current. Accordingly, each of the coaxial cables transports a different portion of pulsed current than each of the PCBs and each of the spring leaf connectors; each of the spring leaf connectors transports a different portion of current than each of the PCBs and each of the coaxial cables; and each of the PCBs transports a different portion of current than each of the PCBs and each of the spring leaf connectors. In some implementations, there may be different numbers of PCBs, different numbers of coaxial cables, and different numbers of spring leaf connectors. For example, the number of spring leaf connectors may be increased so that the portions of current transmitted by each spring leaf connector and each coaxial cable are equal. In some implementations, different PCBs may include different numbers of coaxial cable connections and different numbers of spring leaf connections.

The coaxial cables, the PCBs, and the spring leaves may be configured and arranged to minimize the resistance and the inductance of the interposer assembly. For example, a computer program may be executed to simulate various configurations of the interposer and the configuration that produces the lowest resistance and inductance for a given current or range of currents may be selected. The coaxial cables, the PCBs, and the spring leaves may be configured and arranged to reduce the resistance and the inductance of the interposer assembly. For example, increasing the numbers of conductive paths, while maintaining them in parallel may reduce these characteristics of the interposer. The spring leaves may be configured and arranged to implement a target resistance and a target inductance of the interposer assembly. For example, by selecting the numbers and arrangements of components of the interposer—e.g., the PCBs, the coaxial connections, and the spring leaves—it is possible to produce specific resistance and inductance in the interposer.

Figure 4:
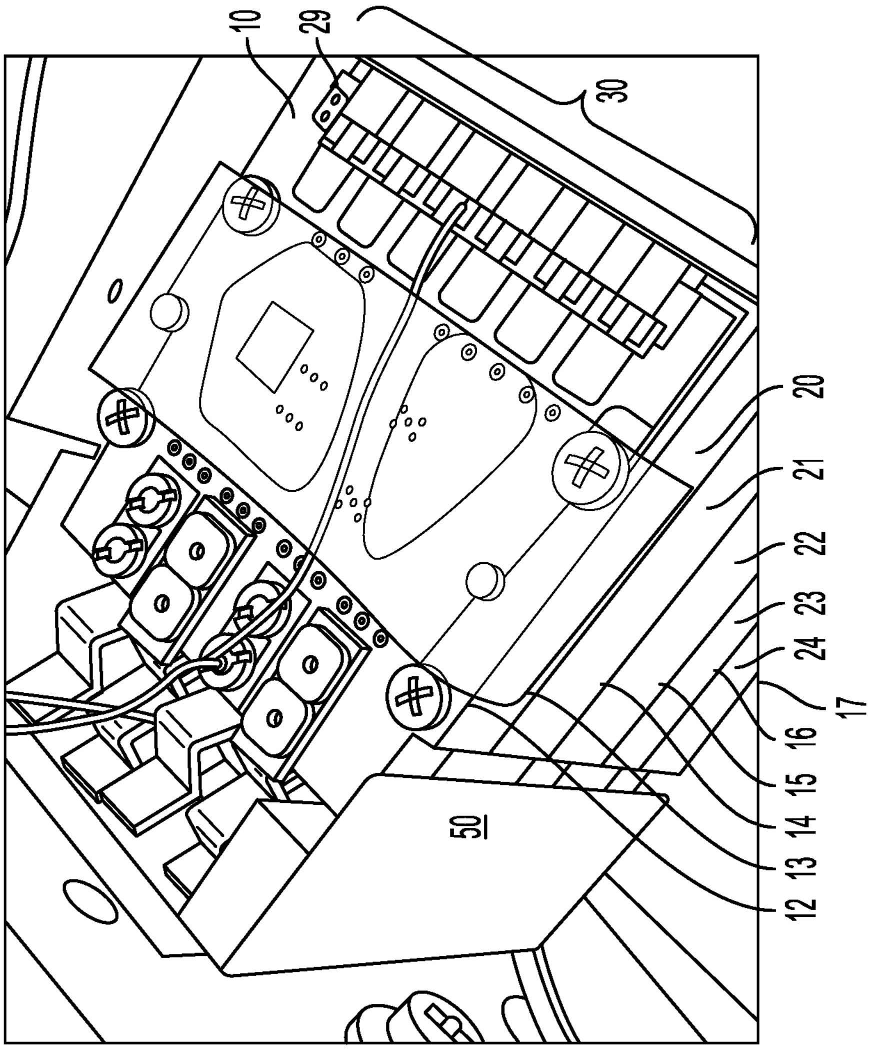
FIG. 4 is a top perspective photograph of the example interposer.

In some implementations, interposer 10 includes a shroud 50 comprised of electrically-insulating insulating material. Shroud 50 is at least partly around spring leaf assembly, particularly the areas where human contact with electrical conductors is possible. In some implementations, shroud 50 surrounds the entire spring leaf assembly. In some implementations, as shown in FIG. 4, shroud 50 is around sides of the spring leaf assembly and extends partway along sides of the PCBs to cover any electrical connections that may exist along the sides of the PCBs.

Figure 5:
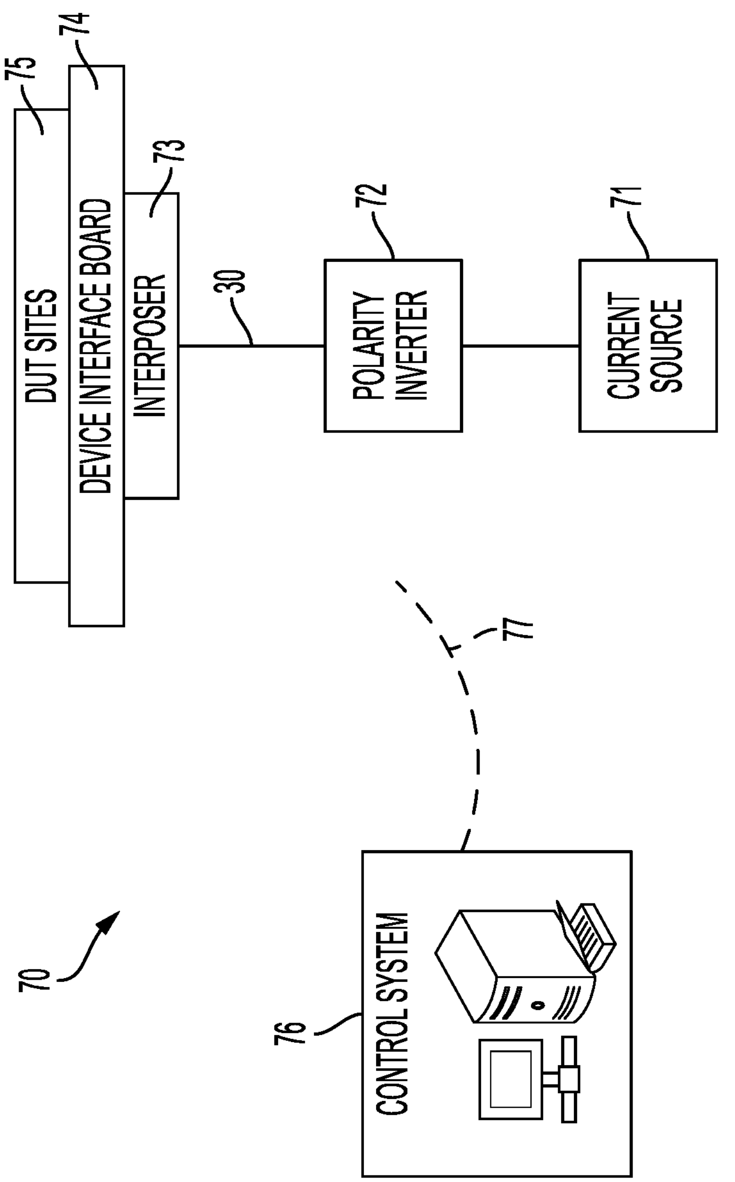
FIG. 5 is block diagram of an example test system that includes the interposer.

In some implementations, interposer 10 may be used to make a blind mate connection to gold or copper pads a DIB or a probe card holding DUTs to be tested by a test system such as automatic test equipment (ATE). For example, the blind-mate connection may be within a test head of the ATE. A blind-mate connector includes self-aligning features that guide the connector into the correct mating position. Connections to the gold or copper pads may alternate in polarity such that each positive connection is next to each negative connection, thereby reducing inductance Referring to FIG. 5, an example test system, such as ATE 70, may include a current source 71, a polarity inverter 72, an interposer 73 of the type described herein, and a DIB 74. In an example the interposer may have an inductance of 100 nh or less for a pulsed current of 2000 A or more. In another example, the interposer may have a resistance of 3 milliohms (mΩ) or less for a current of 2000 A or more. In another example, the interposer may have an inductance of 500 nH or less for a pulsed current of 2000 A or more. In still another example, the interposer may have a resistance of 10 mΩ or less for a pulsed current of 2000 A or more.

During operation, current flows from the current source through the polarity inverter 72, where its polarity is either kept the same or changed based on requirements to test DUTs connected to the test system. In some examples, the polarity inverter may be omitted. Current output from the polarity inverter is passed to interposer 73 which, in this example includes an electrical and/or mechanical interface to DIB 74. The current is passed from polarity inverter 72 to interposer 73 over coaxial cables, such as coaxial cables 30. Current from the interposer then passes to the DIB. The DIB, as noted, holds DUTs in sites 75 for testing and distributes the current from interposer 73 to the DUTs in the sites for testing. In some implementations, multiple interposers of the type described herein may be connected to a single DIB.

In some implementations, the coaxial cables each have a length of 13 meters or 13.5 meters; however, different lengths may be used. For example, the coaxial cables each may have lengths defined in triple-digit meters or less; the coaxial cables each may have lengths defined in double-digit meters or less; the coaxial cables each may have lengths defined in single-digit meters or less; the coaxial cables each may have lengths defined in single-digit decimeters or less; or the coaxial cables each may have lengths defined in single-digit centimeters or less. In some implementations, particularly those that have shorter distances between the interposer and the current source, electrical conduits other than coaxial cables may be used.

ATE 70 also includes a control system 76. The control system may include a computing system comprised of one or more microprocessors or other appropriate processing devices as described herein. Communication between the control system and the other components of ATE 70 is represented conceptually by line 77. DIB 74 includes a PCB having sites that include mechanical and electrical interfaces to one or more DUTs that are being tested or are to be tested by the ATE. Power, including voltage, may be run via one or more layers in the DIB to DUTs connected to the DIB. DIB 74 also may include one or more ground layers and one or signal layers with connected vias for transmitting signals to the DUTs.

Sites 75 may include pads, conductive traces, or other points of electrical and mechanical connection to which the DUTs may connect. Test signals and response signals, including high current signals pass via test channels over the sites between the DUTs and test instruments. DIB 74 may also include, among other things, connectors, conductive traces, conductive layers, and circuitry for routing signals between test instruments, DUTs connected to sites 75, and other circuitry.

Control system 76 communicates with test instruments (not shown) to control testing. Control system 76 may also configure the polarity inverter 72 to provide voltage/current at the polarity required for testing. The control may be adaptive in that the polarity may be changed during testing if desired or required.

All or part of the test systems described in this specification and their various modifications may be configured or controlled at least in part by one or more computers such as control system 76 using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with configuring or controlling the test system described herein can be performed by one or more programmable processors executing one or more computer programs to control or to perform all or some of the operations described herein. All or part of the test systems and processes can be configured or controlled by special purpose logic circuitry, such as, an FPGA (field programmable gate array) and/or an ASIC (application-specific integrated circuit) or embedded microprocessor(s) localized to the instrument hardware.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. An interposer for a test system, the interposer comprising:

coaxial cables, each of the coaxial cables being configured to transport a first current originating from a current source;

printed circuit boards (PCBs), each of the PCBs being connected to a set of the coaxial cables in order to receive the first current from each coaxial cable in the set and to transport a second current; and a spring leaf assembly comprising spring leaves, each of the spring leaves being connected to a PCB in order to transport a third current obtained from the PCB to a device interface board (DIB) that connects to devices under test (DUTs) to be tested by the test system, each of the spring leaves having one of a plurality of polarities defined by the third current;

wherein the coaxial cables on each PCB are arranged in parallel, the PCBs are arranged in parallel, and the spring leaves on each PCB are arranged in parallel; and wherein on each PCB, a set of the spring leaves is arranged such that adjacent spring leaves have different polarities.

2. The interposer of claim 1, wherein the interposer has an inductance of 100 nanohenries (nH) or less for a current of 2000 amperes (A) or more.

3. The interposer of claim 1, wherein the interposer has a resistance of 3 milliohms (me) or less for a current of 2000 amperes (A) or more.

4. The interposer of claim 1, wherein the interposer has an inductance of 500 nanohenries (nH) or less for a current of 2000 amperes (A) or more.

5. The interposer of claim 1, wherein the interposer has a resistance of 10 milliohms (mΩ) or less for a current of 2000 amperes (A) or more.

6. The interposer of claim 1, wherein the first current is different from the second current.

7. The interposer of claim 1, wherein the second current is different from the third current.

8. The interposer of claim 1, wherein the first current is equal to the third current.

9. The interposer of claim 1, wherein the second current is different from the third current and the first current.

10. The interposer of claim 1, wherein each coaxial cable comprises a center conductor and shield surrounding the center conductor, the shield comprising a return for current transmitted through the center conductor, the shield and the center conductor implementing a least some inductance cancellation.

11. The interposer of claim 1, wherein each coaxial cable comprises a center conductor and a shield surrounding the center conductor and separated from the center conductor by a dielectric, the shield comprising a return for current transmitted through the center conductor, where the shield, the center conductor, and a thickness of the dielectric are configured for maximizing inductance cancellation.

12. The interposer of claim 1, further comprising:

a shroud comprised of electrically-insulating insulating material, the shroud being at least partly around the spring leaf assembly.

13. The interposer of claim 1, which comprises part of a blind-mate connection within a test head of the test system.

14. The interposer of claim 1, further comprising;

electrically-insulating material separating each of the PCBs.

15. The interposer of claim 1, wherein each PCB comprises a surge suppressor to protect against voltage spikes or current spikes on the PCB.

16. The interposer of claim 1, wherein the coaxial cables, the PCBs, and the spring leaves are configured and arranged to achieve a target resistance and a target inductance of the interposer.

17. The interposer of claim 1, wherein the interposer connects to low-inductance copper pads on the DIB within an area that is 2 inches (5.08 centimeters (cm)) by 3 inches (7.62 cm) or less.

18. A test system comprising:

a device interface board (DIB) to connect to devices under test (DUTs); and a test head comprising a blind-mate connection to the DIB, the blind-mate connection comprising an interposer assembly, the interposer assembly comprising;

coaxial cables, each of the coaxial cables being configured to transport a first current originating from a current source;

printed circuit boards (PCBs), each of the PCBs being connected to a set of the coaxial cables in order to receive the first current from each coaxial cable in the set and to transport a second current; and a spring leaf assembly comprising spring leaves, each of the spring leaves being connected to a PCB in order to transport a third current obtained from the PCB to the DIB, each of the spring leaves having one of a plurality of polarities defined by the third current;

wherein the coaxial cables on each PCB are arranged in parallel, the PCBs are arranged in parallel, and the spring leaves on each PCB are arranged in parallel; and wherein on each PCB, a set of the spring leaves is arranged such that adjacent spring leaves have different polarities.

19. The test system of claim 18, wherein the coaxial cables have lengths defined in double-digit meters or less.

20. The test system of claim 18, wherein the coaxial cables have lengths defined in single-digit meters or less.

21. The test system of claim 18, wherein the coaxial cables have lengths defined in single-digit decimeters or less.

22. The test system of claim 18, wherein the coaxial cables have lengths defined in single-digit centimeters.

23. The test system of claim 18, wherein the coaxial cables, the PCBs, and the spring leaves are configured and arranged to minimize the resistance and the inductance of the interposer assembly.

24. The test system of claim 18, wherein the coaxial cables, the PCBs, and the spring leaves are configured and arranged to reduce the resistance and the inductance of the interposer assembly.

25. The test system of claim 18, wherein the coaxial cables, the PCBs, and the spring leaves are configured and arranged to implement a target resistance and a target inductance of the interposer assembly.

* * * * *